United States Patent Office 3,347,656
Patented Oct. 17, 1967

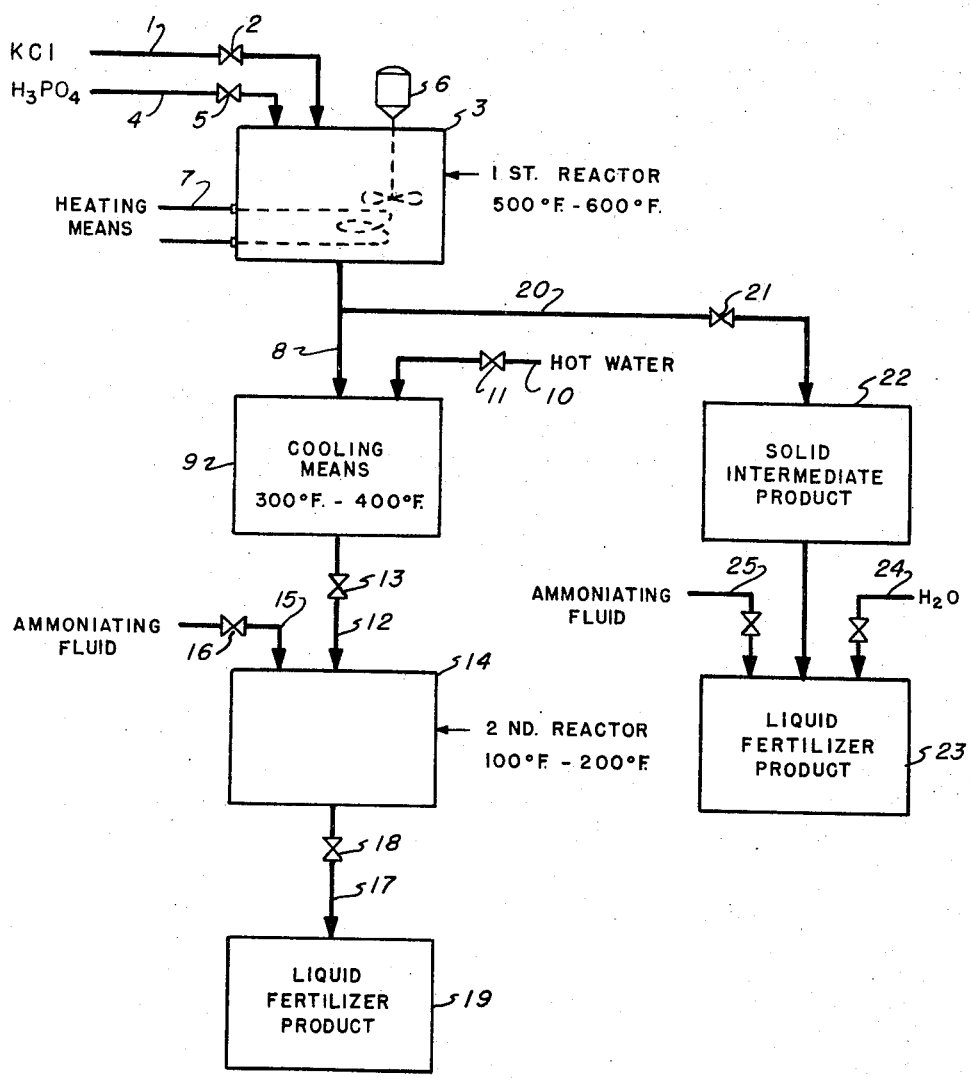

3,347,656
PRODUCTION OF POTASSIUM AMMONIUM
POLYPHOSPHATE SOLUTION
John M. Potts, Florence, and Archie V. Slack, Sheffield,
Ala., assignors to Tennessee Valley Authority, a corporation of the United States
Filed May 28, 1964, Ser. No. 371,152
6 Claims. (Cl. 71—36)

ABSTRACT OF THE DISCLOSURE

A process for the production of low-chloride liquid fertilizer (typical grade 5–30–15) consists of reacting potassium chloride with phosphoric acid at about 550° F., cooling the reaction mixture to about 300° F. adding water and cooling further to about 180° F., and ammoniating to prepare the product.

Our invention relates to a new high-analysis potassium ammonium polyphosphate fertilizer solution and, in addition, to the production of a solid potassium polyphosphate fertilizer intermediate material which can subsequently be utilized for the production of high-analysis potassium ammonium polyphosphate fertilizer solutions, and still more particularly to the production of such potassium ammonium polyphosphate solutions by the reaction between potassium chloride, phosphoric acid, and an ammoniating fluid.

Heretofore liquid mixed fertilizers having composition similar to those of standard dry mixed fertilizers have been well known and such fertilizers are increasing in popularity in the industry. Such solutions have numerous advantages over dry mixed fertilizers in that the cost of evaporating moisture and bagging the product are eliminated and such liquid fertilizers greatly simplify the operation of applying plant nutrients to the soil.

However, liquid mixed fertilizers have, in the past, had some outstanding disadvantages. Raw-material costs have proved to be relatively high and some of the solutions produced have been so corrosive as a result in high maintenance and storage costs. Except for some recent innovations, the liquid fertilizer solutions produced by the prior-art methods have also been limited to a maximum content of plant food of about 33 weight percent. This upper limit of available plant nutrients in prior-art solutions results from the fact that solutions having concentrations in excess of this amount always have been found to crystallize and precipitate salts out of solution when stored at or below room temperature.

A fairly recent breakthrough in the above-mentioned maximum content of plant-food nutrient units in liquid mixed fertilizers is shown in U. S. Letters Patent No. 2,950,961, Marcus M. Striplin, Jr., et al., assigned to the assignee of the present invention. Striplin teaches the production of liquid mixed fertilizers which ordinarily contain up to as much as 60 weight percent plant food. This unusually high percent of plant food content is obtained in his process by ammoniating superphosphoric acid under controlled conditions. Superphosphoric acid —a concentrated phosphoric acid having generally from about 70 to about 85 weight percent $P_2O_5$ content—is rapidly becoming a popular raw material in the fertilizer industry for the production of liquid fertilizers.

The term "superphosphoric acid" as used presently in the industry is defined generally as a phosphoric acid containing substantial quantities of orthophosphoric acid, pyrophosphoric acid, and higher acyclic polymers of phosphoric acid, generally referred to as polyphosphoric acid. These polyphosphoric acids include from the tri poly to the nona polymer and higher. The proportions of polyphosphoric acids vary with the $P_2O_5$ content of the superphosphoric acid. The Canadian Journal of Chemistry, vol. 34 (1956), page 790, show the distribution of these polyphosphoric acids in superphosphoric acid in the range from about 70 to 85 weight percent $P_2O_5$.

Alternatively, if wet-process phosphoric acid is concentrated from the usual maximum of about 54 percent $P_2O_5$ up to the range of about 65 to 75 percent $P_2O_5$ by a process such as shown in the copending application of John G. Getsinger, Serial No. 835,377, filed August 21, 1959, and assigned to the assignee of the present invention the distribution of the ortho-, pyro-, and higher acyclic polymers of the polyphosphric acids will be somewhat similar to that shown in the above-mentioned Canadian Journal of Chemistry. The presence of the impurities in such concentrated wet-process phosphoric acid and the $H_2O:P_2O_5$ ratio in acids so concentrated is believed to somewhat alter the distribution of the various polymers in this wet acid system.

Prior-art processes and methods for the production of concentrated high-analysis liquid mixed fertilizers have proved operative; however, the industry has long felt the need for a high-analysis, liquid mixed fertilizer of greater flexibility for balance of the formulation thereof and adjusting the ratios of the 3 primary plant nutrients, viz. $N:P_2O_5:K_2O$. This need for greater flexibility in the formulation and adjustment of the ratios of these primary plant nutrients stems mainly from the fact that in this form of fertilizer, viz. a liquid mixed fertilizer, there is a marked and limited solubility of some of the usual fertilizer compounds, particularly potassium chloride. Potassium chloride is a relatively cheap and economical source of the plant-nutrient value of $K_2O$ and as such would lend itself as a raw material in the preparation of liquid mixed fertilizers except for the marked limitation of solubility in aqueous liquid mixed fertilizer products. The solubility of potassium chloride in water, for example, is only about 15 units of $K_2O$ at a temperature of 32° F. Thus, for all practical purposes, the highest grade of liquid mixed fertilizer which can be prepared in aqueous medium and which does not salt out above 32° F. would be the grade (0–0–15) in the instance where potassium chloride is the raw material selected as the source of $K_2O$. In the instance wherein a liquid mixed fertilizer is desired having plant nutrient values containing, in addition to $K_2O$ supplied from potassium chloride as a raw material, the other primary nutrients, nitrogen and $P_2O_5$, the degree of solubility of potassium chloride in such aqueous medium is still more limited such that, for instance, in a conventional 1:3:1 ratio aqueous liquid mixed fertilizer containing 6-unit values of nitrogen and 18-unit values of $P_2O_5$, no more than 6 units $K_2O$ can be incorporated therein. In addition, the industry has also recognized a need for nonchloride potassium fertilizers for some crops, and in such instances, the $K_2O$ values must be supplied by other, relatively expensive, $K_2O$ sources such as potassium hydroxide and potassium carbonates.

Our invention is directed to the production of a highly concentrated base solution containing all 3 major plant nutrients in a form suitable for a assimilation by plants, but containing only very minor amounts of chlorine, which chlorine is undesirable in fertilizers for some crops.

We have overcome the disadvantages inherent in both liquid mixed and and dry granular fertilizers of the type shown in the prior art to a substantial extent in the present invention by providing a method and process for the production of aqueous potassium ammonium polyphosphate fertilizer solutions wherein potassium chloride is used as the raw material source for applying the $K_2O$ values at concentrations substantially greater than previously possible in the art, and which solutions contain only very minor amounts of the element chlorine, which element is undesirable in fertilizers for some crop plants. Furthermore, several new advantageous features over conventional dry mixed and/or liquid mixed fertilizer materials are realized by the present invention.

Among these advantages are: first, the utilization of relatively cheap potassium chloride as a raw material for supplying the $K_2O$ values in such a manner that the resulting $K_2O$ concentration is substantially greater than previously obtained; second, a product wherein the ratio of the 3 major nutrients is approximately 1:6:3 resulting in grades which may vary from as little as (1–6–3) to (6–36–18) as shown infra. As an alternate to our process, a solid intermediate product may be produced having the advantages over liquid mixed fertilizers mentioned above in economy, convenience of transportation, and storage in that this solid intermediate product may be shipped and subsequently at or near the site of application may be dissolved in water and ammoniating fluid to form the aqueous potassium ammonium polyphosphate liquid mixed fertilizer solution of our invention. Transportation of liquid fertilizers has been, in some instances, handicapped by lack of transportation equipment. The expense of storing liquid fertilizers has also, in some instances, prevented many manufacturers from obtaining their supply before the peak season. During the peak season there are not enough tank cars or trucks available to transport liquid material. In addition, there exists the possibility of crystallization of stored liquid mixed fertilizers in inclement, extremely cold weather. The intermediate composition of our invention is free from these disadvantages since it can be shipped in readily available box cars and stored in open bins and it is unaffected by cold weather. Finally, this intermediate material of our invention is extremely water soluble. Thus, it can be seen that our invention is an extremely flexible one in that our process enables the production of liquid mixed fertilizers in which the $K_2O$ values may be supplied by the relatively cheap raw material, potassium chloride, in concentrations substantially greater than previously available and, alternatively, during the peak fertilizer production seasons our process is flexible enough to enable the production of an intermediate solid potassium polyphosphate material which can be shipped as such solid in bulk and at or near the site of application mixed with ammoniating fluid and water to produce the above-mentioned aqueous liquid mixed potassium ammonium polyphosphate fertilizer solution. In addition to the advantages above, our process may be so operated that it is possible to recover the byproduct hydrogen chloride in anhydrous form, in which form it is less corrosive than wet hydrogen chloride. Such anhydrous hydrogen chloride may be shipped more economically over greater distances than water solutions of byproduct hydrogen chloride (hydrochloric acid), and this economy obviously helps in providing a financial return for the overall process of the present invention.

It is therefore an object of the present invention to produce a new high-analysis aqueous potassium ammonium polyphosphate fertilizer solution substantially free from the element chlorine by a process wherein the raw material, potassium chloride, is utilized as the source of $K_2O$.

Another object of the present invention is to produce a new high-analysis, aqueous potassium ammonium polyphosphate fertilizer solution substantially free from the element chlorine by a process wherein the raw material, potassium chloride, is utilized as the source of $K_2O$, and which resulting liquid mixed fertilizer solution contains all 3 major plant nutrients in a form suitable for assimilation by plants and in ratios one to another previously unobtainable by the methods of the prior art wherein said potassium chloride is relied upon as a source for the major nutrient $K_2O$.

Still another object of the present invention is to produce a new high-analysis aqueous potassium ammonium polyphosphate fertilizer solution substantially free from the element chlorine by a process wherein the raw material, potassium chloride, is utilized as the source of $K_2O$, wherein the 3 major plant nutrients in said aqueous liquid mixed fertilizer solution product are in the ratio of approximately 1:6:3 and the grade of said product varies from about (1–6–3) up to a grade of approximately (6–36–18).

A further object of the present invention is to provide a process for the production of an aqueous potassium ammonium polyphosphate liquid mixed fertilizer solution of high analysis by an alternative process of said invention wherein a solid intermediate product of potassium polyphosphate is formed and which intermediate product may be transported as solid material in bulk to or near the site of application and may subsequently, through the addition of water and ammoniating fluid, be converted into the desired liquid mixed fertilizer solution for direct application to the soil.

A still further object of the present invention is to provide a process for the production of aqueous liquid high-analysis potassium ammonium polyphosphate mixed fertilizer solutions substantially free of the element chlorine by a process wherein the raw material relied upon for supplying the major plant nutrient $K_2O$ is potassium chloride and in which process byproduct anhydrous hydrogen chloride is obtained.

Still further and more general objects and advantages of the present invention will appear from the more detailed description set forth below, it being understood, however, that this more detailed description is given by way of illustration and explanation only, and not by way of limitation, since various changes therein may be made by those skilled in the art without departing from the spirit and scope of the present invention.

In carrying out the objects of our invention in one form thereof, we react a fluid mixture (approximately 0:2:1 nutrient ratio) of potassium chloride and phosphoric acid at about 500° to about 600° F. in order to volatilize hydrogen chloride gas and to produce a mixture of potassium polyphosphates and unreacted phosphoric acid. The mixture is subsequently cooled to about 300° F. to about 400° F. at which temperature it is still fluid. Hot water (which may be boiling water) is introduced into the still fluid mixture to dissolve the same in aqueous solution without going through any appreciable solid phase. This aqueous solution is then further cooled and kept below a temperature of about 180° F. while it is being ammoniated to approximately neutral pH. The nutrient ratio of this product is approximately 1:6:3.

Our invention, together with further objects and advantages thereof will be better understood from a consideration of the following description taken in connection with the accompanying drawing in which:

The drawing is a flowsheet generally illustrating the principles of our process which results ultimately in the production of an aqueous high-analysis liquid mixed potassium ammonium polyphosphate fertilizer solution.

Referring now more specifically to the drawing, potassium chloride from a source not shown is led via line 1 and means for control 2 into first reactor 3. Phosphoric acid, also from a source not shown, is lead via line 4 and means for control 5 into first reactor 3. In carrying out the process in a batchwise operation, either the potassium chloride or phosphoric acid may be added first, but preferably the acid should be added first to facilitate mixing. However, if the process is carried out on a continuous basis both streams of material would be introduced into reactor 3 simultaneously. Reactor 3 is provided with agitating means generally illustrated as 6 and heating means generally illustrated as 7. The material in reactor 3 is kept at a temperature in the range of about 500° F. to about 600° F. to provide for the volatilization of hydrogen chloride gas and to produce a mixture of potassium polyphosphates and unreacted phosphoric acid. After the material has sufficiently reacted, it may be led via line 8 into cooling means 9 wherein it is cooled down to a temperature in the range from about 300° F. to about 400° F. The resulting partially cooled fluid material is then dissolved through addition of hot water from a source not shown via line 10 and means for control of flow 11. Subsequently, the now aqueous solution of potassium polyphosphates and unreacted phosphoric acid is led via line 12 and means for control of flow 13 into a second reactor 14 wherein the temperature of the aqueous medium is kept in the range from about 100° F. to about 200° F., and preferably less than about 180° F. Ammoniating fluid, which may be either anhydrous ammonia, gaseous ammonia, aqueous ammonia, or mixtures thereof, is led via line 15 and means for control of flow 16 into second reactor 14 until the material therein is neutralized to a pH of about 7 wherein it is led via line 17 and means for control of flow 18 as the desired liquid fertilizer product into collection means 19. Although we have shown supra the carrying out of our process in a first reactor a cooling means or vessel and a second reactor, the material introduced into reactor 3, viz. potassium chloride and phosphoric acid, obviously could be, particularly in batchwise operation, heated to the desired range of 500° F. to 600° F., held at that temperature for a time suitable for the formation of the potassium polyphosphates and unreacted phosphoric acid melt, subsequently cooled in the same vessel reactor 3 down to the range of about 300° F. to 400° F. in said vessel and still subsequently cooled down to the temperature specified supra in the second reactor 14, viz. 100° F. to 200° F., at which time ammoniating fluid could then be introduced into reactor 3, and the resulting product collected therein.

As an alternative to the present invention, referring again to the drawing, potassium chloride from a source not shown may be led via line 1 and means for control of flow 2 into the first reactor 3, along with a stream of phosphoric acid, also from a source not shown, said phosphoric acid stream being led into reactor 3 via line 4 and means for control of flow 5. After the desired potassium polyphosperic acids are formed in reactor 3 the temperature maintained therein in the desired range of about 500° F. to about 600° F. by means of heating means 7 and stirred by agitating means 6, the reacted material may be led, in our alternative process, out of reactor 3 via line 20 and means for control of flow 21 into any suitable means for collection generally illustrated as 22. The material in collection means 22 is then allowed to come to ambient atmospheric temperature, at which time it is a solid mixture of the potassium polyphosphate and unreacted phosphoric acid material referred to supra as our solid intermediate product. This product may subsequently be shipped to or near the site of application and at a later time, as is indicated at vessel 23, ammoniating fluid and water may be added to said solid intermediate product to form the desired potassium ammonuim polyphosphate solution.

We have found that, in reacting potassium chloride and phosphoric acid at 500° F. to 600° F., it is necessary that the mixture contain at least twice as much $P_2O_5$ as $K_2O$ in order to ensure essentially complete volatilization of the chlorine as hydrogen chloride. If more than this amount of $K_2O$ is present as potassium chloride, unreacted potassium chloride remains in the product. The potassium chloride and acid can be mixed cold and then heated to the reaction temperature or the materials can be added separately to a mixture that is maintained at the reaction temperature. There is not much reaction when the mixture is cold, but when the temperature is raised, the reaction becomes rapid and foaming occurs due to the evolution of hydrogen chloride. It is necessary to provide suitable means for controlling foaming such as mechanical foam breakers or air jets.

In our process, the reaction time and the reaction temperature are interrelated; if the temperature is high enough the time of reaction can be shortened to as little as possibly 15 minute, but if the temperature is too low the reaction might take several days. The upper limit of the reaction temperature, depending to some extent on the time as indicated above, is about 600° F. If the mixture is heated too long at a temperature that is too high, the phosphate species formed are insoluble; whereas, if the limiting time and temperature are almost reached but not exceeded, the phosphate species formed are more soluble than those (orthophosphates) which are formed at lower temperatures. Hence, the preferable temperature is close to about 600° F.

The phosphoric acid used for the reaction may be of a wide variety of concentration and may contain impurities. If the concentration of the pure acid is below about 69 percent $P_2O_5$, all of the $P_2O_5$ is in orthophosphate form; however, when the temperature is raised to the reaction level the orthophosphate is transformed to more condensed species. One of the major differences in using more concentrated acid is that the reaction is faster. Another difference is that if the concentration of the acid is high enough, it is possible to recover the byproduct hydrogen chloride in anhydrous form which is less corrosive than wet hydrogen chloride. This is of considerable economic importance. The anhydrous hydrogen chloride can be shipped economically over greater distances than water solutions of hydrogen chloride (hydrochloric or muriatic acid) and this helps in providing a financial return to the process. Another difference which would also have economic significance is that less heat would be needed when strong acid is used. On the other hand, there would be an advantage in using "filter-grade" acid (30 percent $P_2O_5$) in that the acid concentration step could be eliminated.

There are other possible ways of utilizing the byproduct hydrogen chloride. For instance, hydrochloric acid might be used to acidulate phosphate rock and produce a variety of fertilizers or fertilizer materials, or it might be used to produce hydrogen and chlorine by the process of electrolysis. In any event, the hydrogen chloride should be recovered and some disposition be made of it; otherwise, it would constitute a serious atmospheric pollutant.

After the potassium chloride and phosphoric acid are reacted at 500° F. to 600° F., it is desirable to cool the mixture to minimize hydrolysis to orthophosphates when water is added. Although the mixture is quite fluid at the reaction temperature, it solidifies into a solid upon cooling to room temperature (80° F.). However, it was found that the mixture remained fluid when it was cooled to as low as 240° F. and that hot water could be added at a temperature of 300° to 400° F. or preferably about 360° F. without causing appreciable solidification. The few solids that formed dissolved readily in about 5 minutes. It was found desirable to cool the solution of potassium polyphosphate and phosphoric acid further and maintain it below about 180° F. during ammoniation to avoid excessive ammonia loss and hydrolysis of the polyphosphates to orthophosphates.

In order that those skilled in the art may better understand how the present invention can be practiced and more fully and definitely understood, the following examples of processes that we have used in the preparation for the production of potassium ammonium polyphosphate fertilizer solutions containing substantial amounts of all 3 major plant nutrients of the character indicated herein is given by way of illustration and not by way of limitation.

EXAMPLE I

In this example, tests were made in which potassium chloride and superphosphoric acid were reacted in glassware or a steel rotary drum. Superphosphoric acid was used because it contains part of its phosphate as pyrophosphate, and this portion of the phosphate should form the very soluble monopotassium or dipotassium pyrophosphate rather than the orthophosphates, which of all 3 major plant nutrients of the character indicated that the reaction with potassium chloride is faster when superphosphoric acid rather than ortho acid is used. To further speed the reaction, the mixtures were heated; however, the temperature was kept at 550° F. or lower to minimize formation of slightly soluble potassium metaphosphate.

However, in these tests, potassium chloride was the only crystalline phase present. This was due, we believe, to the fact that the potassium phosphate produced was in condensed form and was more soluble than potassium chloride.

Some of the results of these tests are summarized in Table I below where it can be clearly seen that only in test No. 1 did the reactants supplying the $P_2O_5$ and $K_2O$ values at a ratio of 2:1 yield an intermediate solid product which was soluble in water and had a minimum chlorine content.

TABLE I.—PRODUCTION OF POTASSIUM PHOSPHATES FROM POTASSIUM CHLORIDE AND PHOSPHORIC ACID

| Test Number | 1 | 2 | 3 | 4 | 5 |
|---|---|---|---|---|---|
| Nominal weight ratio | 0:2:1 | 0:3:2 | 0:3:2 | 0:1:2 | 0:1:1 |
| Temperature of test, °F | 550 | 550 | 500 | 750 | 750 |
| Time at test temp., min | 30 | 90 | 90 | | 180 |
| Procedure | (1) | (2) | (3) | (4) | (5) |
| Chemical analysis, percent by wt.: | | | | | |
| $P_2O_5$: | | | | | |
| Total | 63.6 | 54.2 | 49.9 | 28.6 | 44.9 |
| Ortho | 32.9 | | | | |
| Available | | | | 26.5 | 37.5 |
| $K_2O$: | | | | | |
| Total | 33.3 | 34.6 | 34.6 | 50.0 | 45.0 |
| Water soluble [6] | | | | 32.8 | 17.6 |
| Cl | 1.0 | 3.9 | 7.0 | 25.2 | 12.3 |
| Hygroscopic | Yes | Yes | Yes | No | No |
| Soluble in water | Yes | No | Yes | No | No |

[1] Mixed acid and KCl in beaker before heating.
[2] Same as Test 1, except steam was added.
[3] Same as Test 2.
[4] Heated KCl to 750° F. in rotary drum and added acid slowly.
[5] Same as Test 4.
[6] 1-gram sample in 250 ml. for 1 hr., filtered, and analyzed for $K_2O$.

Heating tests

Preliminary tests indicated that complete reaction was not obtained unless the $P_2O_5$:$K_2O$ weight ratio was 2:1 or higher. Therefore, a test was made at this ratio to determine whether a solid or solution product with satisfactory storage properties could be made. The solid product dissolved readily in water to give a 0–36–19 grade solution containing only 0.6 percent chloride. However, crystals formed in the solution after 2 or 3 days, apparently as a result of hydrolysis promoted by low pH. Thus, storage of an acidic solution does not appear promising.

Another test was made to determine whether ammoniation of a solution of the above $P_2O_5$:$K_2O$ ratio to approximately neutral pH would give a solution having satisfactory sotrage properties. A 6–36–18 solution (pH 6.5, 0.4 percent Cl) stored satisfactorily at 80° F. for 2 weeks; after this time crystallization started. A solution of about 5–31–15 grade containing 1.2 percent chlorine had a saturation temperature of 32° F. and thus could be stored satisfactorily at this temperature. The relatively high grade (50 percent total plant food) of this solution should place it in a favorable position in regard to shipping as a base solution.

Crystallization tests

Although most potassium phosphates are very highly soluble, we suspected that monopotassium phosphate ($KH_2PO_4$) might be crystallized from a water solution of this material and potassium chloride. Potassium chloride and 62 percent $P_2O_5$ orthophosphoric acid (0:3:2 nutrient ratio) were reacted for 1 hour at 350° F.; the mixture was cooled, dissolved in water, concentrated to form crystals, and then filtered at 200°, 80°, 32°, and 0° F. The first filtration produced only potassium chloride crystals, but the remaining ones produced mainly monopotassium phosphate.

Further tests were made with superphosphoric acid and potassium chloride heated at 300°, 400°, and 500° F. in an effort to increase volatilization to hydrogen chloride and thereby avoid crystallization of potassium chloride.

EXAMPLE II

Studies were continued from Example I above of the production of potassium polyphosphate by reacting electric-furnace superphosphoric acid (76.9 percent $P_2O_5$) and potassium chloride (61.2 percent $K_2O$) in the fluid state at a moderate temperature. In previous batch tests, in which raw materials blended to give a $P_2O_5$:$K_2O$ mole ratio of 1.2:1 were heated at 500° F. for 2 to 3 hours, about 85 to 90 percent of the chlorine was evolved. In some of these tests, calcined dolomite, 6 to 8 percent by weight, was incorporated with agitation in the melt during the cooling step to neutralize the free acid present. The products had a grade of 0–53–30; they were free flowing and did not cake in accelerated caking tests.

A study of the reaction step on a continuous basis was started. A glass vessel, 4 inches in diameter by 8 inches high, fitted with an agitator, was used as the reaction vessel. Heat was supplied with a laboratory gas burner. The fluid melt was discharged from the reactor through a "dip-leg" type outlet located in the side of the vessel and positioned so that the level of melt was kept at 1 inch. Much of the 7-inch freeboard in the reactor was necessary because of the excessive foaming encountered during the beginning of a test. After start-up, however, little foaming occurred.

To provide good control over the amounts of the materials used, the acid and potassium chloride were premixed ($P_2O_5$:$K_2O$ mole ratio of 1.2:1) before being fed to the reactor with a Sigmamotor pump. The mixture was too viscous to pump at room temperature and, therefore, was heated to 180° F.; this resulted in partial reaction in the premix tank and about 25 percent of the chlorine was evolved in this step. In some tests, 8 percent by weight of calcined dolomite or gaseous ammonia was incorporated in the melt, with agitation, to neutralize the free acid present. The amount of ammonia added was not measured; however, it was believed that an excess was added since unreacted ammonia bubbled through the melt. After solidification, the materials were crushed.

In an effort to obtain good chlorine evolution in short retention time (15 to 45 minutes), the reaction temperature was kept as high as possible for fluid state operation (about 600° to 625° F.); in previous batch tests solidification occurred at higher temperatures. The production rate ranged from about 10 to 30 grams per minute. The total amount of chlorine evolved, including that evolved during the premixing step, ranged from 76 to 94 percent of that originally present in the potash. High evolutions of chlorine were obtained at the higher reaction temperature and longer retention times. The data from these tests are shown in Table II below.

about 60 percent of the phosphate was in the polyphosphate form. The solution did not crystallize during 90 days of storage at 32° F.

EXAMPLE IV

This example shows results from the batchwise reaction of potassium chloride and merchant grade wet-process phosphoric acid (54% $P_2O_5$) as indicated below.

TABLE II.—PRODUCTION OF POTASSIUM POLYPHOSPHATE

|  | No Additives | | | | | 8 Percent Calcined Dolomite Added | | Gaseous Ammonia Added [a] |
| --- | --- | --- | --- | --- | --- | --- | --- | --- |
| Test Number | 48-2 | 42-2 | 43-2 | 46-1 | 50-1 | 48-1 | 49-1 | 46-2 |
| Test conditions [b]: | | | | | | | | |
| Average reactor temperature, °F | 598 | 605 | 600 | 625 | 629 | 600 | 626 | 625 |
| Retention time, min | 16 | 34 | 47 | 16 | 35 | 14 | 17 | 15 |
| Product collection temperature, °F | 560 | (c) | (c) | 460 | 460 | 525 | 515 | 525 |
| Product: | | | | | | | | |
| Chemical analysis, percent by wt.: | | | | | | | | |
| Cl | 5.6 | 5.7 | 2.9 | 4.6 | 1.5 | 5.1 | 3.1 | 4.5 |
| $P_2O_5$: | | | | | | | | |
| Total | | | 59.7 | 56.3 | 59.6 | 51.1 | 53.1 | 53.6 |
| Citrate insoluble | | | 1.6 | 0.2 | 1.6 | Nil | 0.2 | 0.1 |
| Water soluble | | | 46.5 | 50.5 | 38.7 | 50.9 | 48.7 | 40.3 |
| Water soluble ortho | | | 13.1 | 11.1 | 8.1 | 13.7 | 8.9 | 15.5 |
| $K_2O$: | | | | | | | | |
| Total | 31.3 | 31.0 | 32.1 | 30.9 | 33.5 | 28.8 | 31.1 | 30.5 |
| Water soluble | | | 23.3 | 27.1 | 19.4 | 28.3 | 25.9 | 21.9 |
| Total chlorine removed,[d] percent of input | 76 | 76 | 88 | 80 | 94 | 77 | 87 | 80 |
| Appearance,[e][f] | (e) | (e) | (e) | (e) | (e) | (f) | (f) | (e) |

[a] Product contained 2.5 percent N.
[b] Reactants were electric-furnace superphosphoric acid (76.9% $P_2O_5$) and potassium chloride (61.2% $K_2O$) in a 1.2:1 $P_2O_5$:$K_2O$ mole ratio.
[c] Sample collection beaker was not heated.
[d] About 24 percentage points of total chlorine removal was obtained during premixing of the superphosphoric acid and potash.
[e] Sticky.
[f] Friable.

EXAMPLE III

Our process for production of potassium ammonium polyphosphate may be carried out either batchwise or continuously, depending on the circumstances. Since most liquid fertilizer production is carried out batchwise, and since this was a convenient method of operation, most of our experimental work was carried out in this manner. A further example of experimental results is given below.

| | | |
|---|---|---|
| Acid | pct. $P_2O_5$ | 76 |
| Potassium chloride | pct. $K_2O$ | 62 |
| Ammonia, anhydrous | pct. N | 82 |
| Reaction temperature | ° F | 550 |
| Time to reach reaction temperature | min | 30 |
| Reaction time | min | 30 |
| Temperature of melt when dissolved in water | ° F | 360 |
| Product analysis: | | |
| N | pct | 4.8 |
| $P_2O_5$ | pct | 30.1 |
| $K_2O$ | pct | 15.0 |
| Cl | pct | 1.0 |

This test was carried out as follows: Superphosphoric acid and potassium chloride were mixed in a glass beaker with a mechanical stirrer to give a nutrient ratio of 0:2:1. The mixture was heated to 550° F. over a period of about 30 minutes and kept at that temperature for an additional 30 minutes. Rather severe foaming occurred, particularly during the period of heating; however, a mechanical foam breaker on the stirrer controlled foaming satisfactorily.

The melt was cooled before adding water. When boiling water was added to the melt at 240° F. or when unheated water was added to the melt at 360° F., a considerable amount of solids formed. Adding boiling water to the melt at 360° F. resulted in formation of only a small amount of solids, and these dissolved completely in 5 minutes. After cooling to 95° F., the solution was ammoniated with gaseous ammonia to a pH of 6.5. The temperature during ammoniation was kept below 150° F. A typical analysis of the product was 4.8 percent N, 30.1 percent $P_2O_5$, 15.0 percent $K_2O$, and 1 percent Cl;

| | | |
|---|---|---|
| Acid | pct. $P_2O_5$ | 54 |
| Potassium chloride | pct. $K_2O$ | 62 |
| Ammonia, anhydrous | pct. N | 82 |
| Reaction temperature | ° F | 550 |
| Time to reach reaction temperature | min | 60 |
| Reaction time | min | 30 |
| Temperature of melt when dissolved in water | ° F | 300 |
| Product analysis: | | |
| N | pct | 6.3 |
| $P_2O_5$ | pct | 30.25 |
| $K_2O$ | pct | 14.8 |
| Cl | pct | 1.85 |

This test was carried out as follows: Merchant grade phosphoric acid and potassium chloride were mixed in a glass beaker with a mechanical stirrer to give a nutrient ratio of 0:2:1. The mixture was heated to 550° F. over a period of 60 minutes and kept at that temperature for an additional 30 minutes. A high temperature burner was used for heating and severe foaming occurred; however, a mechanical foam breaker on the stirrer controlled foaming satisfactorily.

Boiling water was added to the melt at 300° F. All of the solids dissolved completely in 10 minutes. After cooling, the solution was ammoniated with gaseous ammonia to a pH of 6.8. The temperature during ammoniation was kept below 150° F. The analysis of the product was 6.3 percent N, 30.25 percent $P_2O_5$, 14.8 percent $K_2O$, and 1.85 percent Cl; about 56 percent of the phosphate was in the polyphosphate form. The solution remained free of crystals for 14 days at 80° F.

While we have shown and described particular embodiments in our invention, modifications and variations thereof will occur to those skilled in the art. We wish it to be understood, therefore, that the appended claims are intended to cover such modifications and variations that are within the true scope and spirit of our invention.

What we claim as new and desire to secure by Letters Patent of the United States is:

1. A process for the production of an aqueous high-analysis, potassium ammonium polyphosphate liquid-mixed fertilizer solution containing substantial quantities of the three major plant nutrients ($N-P_2O_5-K_2O$) which comprises the steps of reacting potassium chloride and phosphoric acid, proportioned to give a $P_2O_5:K_2O$ weight ratio in the ultimate product of about 2:1, and at a temperature in the range of about 500° F. to about 600° F. and for a period of time in the range from about 15 minutes to about 90 minutes, said temperature and time ranges being dependent and inversely proportional to one another; cooling the resulting mixture of potassium polyphosphate and phosphoric acid down to a temperature in the range of about 300° F. to about 400° F., adding water at a temperature in the range from about 150° F. to about 212° F. to said resulting mixture of potassium polyphosphate and phosphoric acid; subsequently further cooling the resulting aqueous solution of potassium polyphosphate and phosphoric acid; ammoniating said resulting cooled aqueous solution of said potassium polyphosphate and phosphoric acid to a pH in the range from about 6.5 to about 7 and at a temperature in the range from about 150° F. to about 200° F.; and withdrawing as product from said ammoniated aqueous solution of potassium polyphosphate and phosphoric acid a high-analysis, liquid-mixed potassium ammonium polyphosphate fertilizer solution.

2. The process of claim 1 wherein said phosphoric acid is of a concentration such that its $P_2O_5$ equivalent is within the range from about 60 to 85 weight percent.

3. The process of claim 2 wherein said potassium ammonium polyphosphate product has a nutrient ratio of the 3 major plant nutrients ($N-P_2O_5-K_2O$) of about 1:6:3 and the grades thereof fall within the range from about (1-6-3) to about (6-36-18).

4. A process for the production of an aqueous high-analysis, potassium ammonium polyphosphate liquid-mixed fertilizer solution containing substantial quantities of the three major plant nutrients ($N-P_2O_5-K_2O$) which comprises the steps of introducing into a first reaction vessel a stream of potassium chloride and phosphoric acid; adjusting the relative proportions in said streams of potassium chloride and phosphoric acid to said first reaction vessel to yield in the ultimate product of the process a $P_2O_5:K_2O$ weight ratio greater than about 2:1; maintaining the mixture of said potassium chloride and said phosphoric acid in said first reaction vessel at a temperature in the range from about 500° F. to about 600° F. for a period in the range from about 15 minutes to about 60 minutes; withdrawing the resulting mixture of potassium polyphosphate and unreacted phosphoric acid from said first reactor vessel into a cooling vessel; cooling the material in said cooling vessel to a temperature in the range of about 300° F. to about 400° F.; adding a stream of hot water in the temperature range of about 150° F. to about 212° F. into said cooling vessel; removing from said cooling vessel the resulting aqueous solution of potassium polyphosphate and unreacted phosphoric acid and introducing same into a second reactor vessel; cooling the material in said second reactor vessel into the temperature range of approximately 100° F. to about 200° F.; introducing ammoniating fluid into said second reactor vessel in proportion sufficient to ammoniate the potassium polyphosphate and unreacted phosphoric acid in said second reactor vessel to a pH in the range from about 6.5 to about 7; maintaining the temperature in said second reactor vessel during addition of ammoniating fluid thereto in said temperature range of about 100° F. to 200° F.; and withdrawing from said second reactor vessel as product an aqueous high-analysis potassium ammonium polyphosphate liquid fertilizer solution.

5. A process for the production of an aqueous high-analysis, potassium ammonium polyphosphate liquid mixed fertilizer solution containing substantial quantities of the three major plant nutrients ($N-P_2O_5-K_2O$), said three major plant nutrients being in about a 1:6:3 ratio to one another, which comprises the steps of introducing into a first reaction vessel a stream of potassium chloride and a stream of phosphoric acid; adjusting the relative proportions in said streams of said potassium chloride and said phosphoric acid to said first reaction vessel to yield in the ultimate product of the process a $P_2O_5:K_2O$ weight ratio greater than about 2:1; maintaining the contents of said first reaction vessel at a temperature in the range from about 500° F. to about 600° F. and for a period of time from about 15 minutes to about 90 minutes; removing from said first reactor vessel the resulting hot mixture of potassium polyphosphates and unreacted phosphoric acid; cooling said resulting mixture of potassium polyphosphate and unreacted phosphoric acid down to atmospheric ambient temperature as intermediate product; holding in storage said intermediate product until such time as the final product is desired; producing said final product as an aqueous high-analysis potassium ammonium polyphosphate liquid mixed fertilizer solution by adding water and ammoniating fluid to said intermediate product the amount of said ammoniating fluid added to said intermediate product being sufficient to ammoniate the potassium polyphosphate therein and to substantially neutralize the unreacted phosphoric acid therein to a pH in the final product to a range from about 6.5 to about 7.

6. A stable substantially noncorrosive liquid mixed fertilizer of low viscosity having a pH range of about 6.5 to about 7, containing less than about 2 percent chlorine, and containing from about 40 weight percent to about 65 weight percent total plant nutrients ($N+P_2O_5+K_2O$), the number of units of available $K_2O$ being equal to about one-half the number of units of $P_2O_5$ and the number of units of nitrogen being equal to about one-sixth of the number of units of $P_2O_5$ and consisting essentially of an aqueous solution of ammonium and potassium salts of superphosphoric acid in which the total $P_2O_5$ content is distributed in the following proportion: less than about 50 percent as potassium ammonium orthophosphate, and greater than about 50 percent as potassium ammonium polyphosphates.

References Cited
UNITED STATES PATENTS
3,022,154  2/1962  Potts et al. _____ 71—34

DONALL H. SYLVESTER, *Primary Examiner.*

T. D. KILEY, *Assistant Examiner.*